(12) United States Patent
Matteucci et al.

(10) Patent No.: US 9,174,175 B2
(45) Date of Patent: Nov. 3, 2015

(54) AZIDE CROSSLINKED AND PHYSICALLY CROSSLINKED POLYMERS FOR MEMBRANE SEPARATION

(71) Applicant: DOW GLOBAL TECHNOLOGIES LLC, Midland, MI (US)

(72) Inventors: Scott T. Matteucci, Midland, MI (US); Clark H. Cummins, Midland, MI (US); William J. Kruper, Sandford, MI (US); Harry Craig Silvis, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/345,343

(22) PCT Filed: Sep. 20, 2012

(86) PCT No.: PCT/US2012/056234
§ 371 (c)(1),
(2) Date: Mar. 17, 2014

(87) PCT Pub. No.: WO2013/043807
PCT Pub. Date: Mar. 28, 2013

(65) Prior Publication Data
US 2014/0360366 A1    Dec. 11, 2014

Related U.S. Application Data

(60) Provisional application No. 61/537,387, filed on Sep. 21, 2011.

(51) Int. Cl.
| | |
|---|---|
| B01D 71/58 | (2006.01) |
| B01D 53/22 | (2006.01) |
| C08K 5/28 | (2006.01) |
| C08K 5/43 | (2006.01) |
| C08L 77/12 | (2006.01) |
| C08L 79/08 | (2006.01) |

(52) U.S. Cl.
CPC .............. *B01D 71/58* (2013.01); *B01D 53/22* (2013.01); *C08K 5/28* (2013.01); *C08K 5/43* (2013.01); *C08L 77/12* (2013.01); *C08L 79/08* (2013.01); *B01D 2053/221* (2013.01); *B01D 2257/504* (2013.01)

(58) Field of Classification Search
CPC ...... B01D 53/22; B01D 53/228; B01D 71/58; B01D 2053/221; B01D 2257/504; C08K 5/28; C08K 5/43; C08L 77/12; C08L 79/02
USPC .............................................. 95/45, 51; 96/4
See application file for complete search history.

(56) References Cited

U.S. PATENT DOCUMENTS

| | | | |
|---|---|---|---|
| 3,357,855 A | 12/1967 | Bisschops et al. | |
| 3,714,194 A | 1/1973 | Ulrich | |
| 4,197,133 A | 4/1980 | Zweifel et al. | |
| 6,172,167 B1 | 1/2001 | Stapert et al. | |
| 7,247,191 B2 | 7/2007 | Koros et al. | |
| 7,297,394 B2 | 11/2007 | Khemani et al. | |
| 7,410,525 B1 | 8/2008 | Liu et al. | |
| 7,438,739 B2 | 10/2008 | Ziebarth et al. | |
| 8,030,436 B2 * | 10/2011 | Pacetti et al. | 528/332 |
| 2008/0214743 A1 | 9/2008 | Broos et al. | |
| 2010/0029860 A1 * | 2/2010 | Honma et al. | 525/452 |
| 2010/0126341 A1 | 5/2010 | Matteucci et al. | |
| 2010/0126342 A1 | 5/2010 | Lopez et al. | |
| 2013/0133515 A1 * | 5/2013 | Matteucci et al. | 95/51 |
| 2013/0255490 A1 * | 10/2013 | Matteucci et al. | 95/51 |
| 2013/0269520 A1 * | 10/2013 | Harris et al. | 95/51 |

FOREIGN PATENT DOCUMENTS

| | | | | |
|---|---|---|---|---|
| GB | 816680 | * | 7/1959 | ................. C08J 9/02 |
| WO | WO 2007/030791 | | 3/2007 | |
| WO | WO 2007/099397 | | 9/2007 | |
| WO | WO 2008/064857 | | 6/2008 | |
| WO | WO 2008/101051 | | 8/2008 | |
| WO | WO 2008/112833 | | 9/2008 | |
| WO | WO 2012/088077 | | 6/2012 | |

OTHER PUBLICATIONS

Du, Naiying et al., "Azide-based Cross-Linking of Polymers of Intrinsic Microporosity (PIMs) for Condensable Gas Separation", Macromolucular Rapid Communications, 2011, vol. 32, pp. 631-636.*

(Continued)

*Primary Examiner* — Jason M Greene
(74) *Attorney, Agent, or Firm* — Kagan Binder, PLLC

(57) ABSTRACT

The present invention appreciates that compounds comprising ester linkages and nitrogen-containing moieties that are at least divalent (e.g., urea, urethane, amide, etc.) can be crosslinked with azides to form membranes that are resistant to $CO_2$ plasticization, that are selective for acid gases relative to nonpolar gases such as hydrocarbons, and that have high acid gas flux characteristics. The resultant membranes have stable structure and stable separation properties at higher temperatures and pressures. The membranes are compatible with many industrial processes in which polar gases are separated from nopolar gases. In an exemplary mode of practice, the membranes can be used to separate acid gases from the hydrocarbon gases in natural or non-acid gas components of flue gas mixtures (e.g., $N_2$, $O_2$, etc.).

15 Claims, No Drawings

(56) References Cited

OTHER PUBLICATIONS

Koros et al., "Membrane-based gas separation", Journal of Membrane Science, 83, pp. 1-80, 1993.

Du et al., "Azide-based Cross-Linking of Polymers of Intrinsic Microporosity (PIMs) for Condensable Gas Separation[a,b]" Macromolecular Rapid Communications, 32, pp. 631-636, 2011.

Lin et al, "High-Performance Polymer Membranes for Natural-Gas Sweetening" Adv. Mater., 18, pp. 39-44, 2006.

Chng et al., "Enhanced propylene/propane separation by carbonaceous membrane derived from poly (aryl ether ketone)/2,6-bis(4-azidobenzylidene)-4-methyl-cyclohexanone interpenetrating network" Carbon, 47, pp. 1857-1866, 2009.

Shao et al., Crosslinking and stabilization of nanoparticle filled PMP nanocomposite membranes for gas separations, Journal of Membrane Science, 326, pp. 285-292, 2009.

Kelman et al., "Crosslinking poly[1-(trimethylsilyl)-1-propyne] and its effect on physical activity" Journal of Membrane Science, 320, pp. 123-134, 2008.

Staudt-Bickel et al., "Improvement of $CO_2/CH_4$ separation characteristics of polyimides by chemical crosslinking" Journal of Membrane Science, 155, pp. 145-154, 1999.

Hess et al., "Interaction of Water with N,N'-1,2-Ethanediyl-bis(6-hydroxy-hexanamide) Crystals: A Simulation Study" J. Phys. Chem. B, 113, pp. 627-631, 2009.

\* cited by examiner

US 9,174,175 B2

AZIDE CROSSLINKED AND PHYSICALLY CROSSLINKED POLYMERS FOR MEMBRANE SEPARATION

PRIORITY CLAIM

This application claims the benefit from International No. PCT/US2012/056234, which was granted an International filing date of Sep. 20, 2012, which in turn claims priority from U.S. Provisional patent application having Ser. No. 61/537, 387, filed on Sep. 21, 2011, which applications are incorporated herein by reference in their respective entireties.

FIELD OF THE INVENTION

The present invention relates to membrane separation technology using membranes incorporating crosslinked oligomer (s) and/or polymer(s). More particularly, the present invention relates to membrane separation technology in which compounds comprising ester linkages and nitrogen-containing moieties that are multivalent (e.g., urea, urethane, amide, etc. that are at least divalent) can be crosslinked with azides to form membranes.

BACKGROUND OF THE INVENTION

Polymer membranes have been proposed for various separations. It has been found that different molecules can be made to permeate through selected polymers differently. For example if one component of a mixture is found to permeate though a polymer rapidly and a second component is found to permeate through the polymer more slowly or not at all, the polymer may be utilized to separate the two components. Polymer membranes potentially can be used for gas separations as well as liquid separations.

Numerous research articles and patents describe polymeric membrane materials (e.g., polyimides, polysulfones, polycarbonates, polyethers, polyamides, polyarylates, polypyrrolones, etc.) with desirable gas separation properties, particularly for use in oxygen/nitrogen separation (See, for example, Koros et al., J. Membrane Sci., 83, 1-80 (1993); and Du et al., Macromol. Rapid Commun., 32, 631-636 (2011), hereinafter referred to as the Du Article.

The polymeric membrane materials are typically used in processes in which a feed gas mixture contacts the upstream side of the membrane. This results in a permeate mixture on the downstream side of the membrane with a greater mole fraction of one of the components than the composition of the original feed gas mixture. A pressure differential is maintained between the upstream and downstream sides, providing the driving force for permeation. The downstream side can be maintained as a vacuum, or at any pressure below the upstream pressure.

Membrane performance may be characterized by the flux of a gas component across the membrane. This flux can be expressed as a quantity called the permeability (P), which is a pressure- and thickness-normalized flux of a given component. The separation of a gas mixture is achieved by a membrane material that permits a faster permeation rate for one component (i.e., higher permeability) over that of another component. The efficiency of the membrane in enriching a component over another component in the permeate stream can be expressed as a quantity called selectivity. Selectivity can be defined as the ratio of the permeabilities of the gas components across the membrane (i.e., $P_A/P_B$, where A and B are the two components). A membrane's permeability and selectivity are material properties of the membrane material itself, and thus these properties are ideally constant with feed pressure, flow rate and other process conditions. However, permeability and selectivity are both temperature-dependent. It is desired to develop membrane materials with a high selectivity (efficiency) for the desired component, while maintaining a high permeability (productivity) for the desired component.

The relative ability of a membrane to achieve the desired separation is referred to as the separation factor or selectivity for the given mixture. There are however several other obstacles to use of a particular polymer to achieve a particular separation under any sort of large scale or commercial conditions. One such obstacle is permeation rate. One of the components to be separated must have a sufficiently high permeation rate at the preferred conditions or else extraordinarily large membrane surface areas are required to allow separation of large amounts of material. Another problem that can occur is that at conditions where the permeability is sufficient, such as at elevated temperatures or pressures, the selectivity for the desired separation can be lost or reduced. Another problem that often occurs is that over time the permeation rate and/or selectivity is reduced to unacceptable levels.

A further problem that can occur is that one or more components of the mixture can alter the morphology of the polymer membrane over time. This can degrade the permeability and/or selectivity characteristics of the membrane. One specific way this can happen is if one or more components of the mixture causes plasticization of the polymer membrane. Plasticization occurs when one or more of the components of the mixture causes the polymer to swell. Swelling tends to result in a significant increase in permeabilities for most if not all of the components of a feed mixture. This causes degradation of membrane properties. In particular, selectivity is compromised.

It has been found that $CO_2$ can induce plasticization in many polymers, decreasing performance of the membranes made from the polymers. This can be particularly problematic in separations in which $CO_2$ is to be separated from natural or flue gas mixtures. For example, in applications where $CO_2$ is to be separated from flue or natural gases, both high $CO_2$ fluxes through the membrane and high $CO_2$/non-polar gas selectivities are desired when membranes are used that favor $CO_2$ transport through the membrane. However, the selectivity for $CO_2$ can be lost due to plasticization.

Accordingly, there is a strong need for separation membranes with stable, long lasting membrane properties that can separate acid gases such as $CO_2$ from other gases and yet are highly resistant to $CO_2$ induced plasticization. Additionally, there is a strong need for a polymeric membrane that exhibits high selectivity for the separation of gas mixtures of over a wide temperature range, thereby maintaining high selectivity at different process conditions and temperatures common to an industrial gas separation process.

SUMMARY OF THE INVENTION

The present invention appreciates that compounds comprising ester linkages and nitrogen-containing moieties that are at least divalent (e.g., urea, urethane, amide, etc.) can be crosslinked with azides to form membranes that are resistant to $CO_2$ plasticization, that are selective for acid gases relative to nonpolar gases such as hydrocarbons, and that have high acid gas flux characteristics. Representative embodiments of the invention are crosslinked membranes that have better resistance to plasticization than non-chemically crosslinked polymers and even better performance than polymers chemically crosslinked via other functionality such as via silane functionality The resultant membranes have stable structure and unexpectedly stable separation properties over a wide range of temperatures, including higher temperatures and pressures such as those associated with industrial gas separation facilities. Another advantage is that the technology can be applied to a variety of thermoplastic or condensation polymers using variable levels of azide crosslinking material(s) in a convenient reactive extrusion unit operation. The membranes are compatible with many industrial processes in which polar gases are separated from nopolar gases. In an exemplary mode of practice, the membranes can be used to separate acid gases from the hydrocarbon gases in natural or non-acid gas components of flue gas mixtures (e.g., $N_2$, $O_2$, etc.).

In one aspect, the present invention relates to a curable composition, comprising:

a) at least one compound comprising a plurality of ester moieties and a plurality of N-containing backbone moieties, wherein each N-containing moiety is at least divalent; and b) at least one azide crosslinking agent.

In another aspect, the present invention relates to a cured composition derived from ingredients comprising:

a) at least one compound comprising a plurality of ester moieties and a plurality of N-containing backbone moieties, wherein each N-containing moiety is at least divalent; and b) at least one azide crosslinking agent.

In another aspect, the present invention relates to a method of making a separation system, comprising the steps of:

a) providing a separation membrane derived from ingredients comprising a composition comprising components (a) and (b) set forth in paragraph [011]; and b) causing the membrane to be used to separate components of a feed mixture to provide a first separation product that is enriched with respect to an ingredient of the feed mixture and a second separation product that is depleted with respect to the ingredient.

In another aspect, the present invention relates to a purification system, comprising:

a) a feed mixture comprising at least one acid gas and at least one nonpolar gas;

b) a membrane having an inlet face and an outlet face, wherein the membrane is derived from ingredients comprising i) at least one compound comprising a plurality of ester moieties and a plurality of N-containing backbone moieties, wherein each N-containing moiety is at least divalent; and ii) at least one azide crosslinking agent; and c) a pressure differential between the inlet face and outlet face effective to provide a first separation product that is enriched with respect to the acid gas relative to the feed mixture and a second separation product that is depleted with respect to the acid gas relative to the feed mixture when the feed mixture is caused to contact the membrane.

DETAILED DESCRIPTION OF PRESENTLY PREFERRED EMBODIMENTS

The embodiments of the present invention described below are illustrative and are not intended to be exhaustive or to limit the invention to the precise forms disclosed in the following detailed description. Rather the embodiments are chosen and described so that others skilled in the art may appreciate and understand the principles and practices of the present invention.

The curable compositions of the present invention incorporate ingredients including at least one or more azide crosslinking agents and one or more compounds (hereinafter referred to as "membrane compounds") that comprise a plurality of ester backbone moieties and a plurality of nitrogen-containing moieties that are at least divalent. Examples of these nitrogen-containing moieties include amide, urea, and/or urethane moieties. These moieties may be backbone moieties or present in pendant groups, but preferably are backbone moieties.

The membrane compounds may be adducts, oligomers and/or polymers. As used herein, an adduct refers to a compound that is an adduct of two or more reactant molecules, resulting in a single reaction product containing residues of all the reactant molecules. The reactant molecules may be the same or different. An oligomer as used herein is an adduct obtained from 2 to 10 reactant molecules wherein at least one of the reactant molecules is a monomer. A polymer is an adduct obtained from more than 10 reactant molecules, wherein at least one of the reactant molecules is a monomer. Adducts may be obtained by pre-reacting a portion of the reactants to form one or more precursors, which are then assembled to form the final molecule.

Exemplary oligomer and polymer embodiments of membrane compounds include one or more poly(ester-amides), poly(ether-amides), poly(etherester-amides), poly(ester-urethanes), poly(ether-urethanes), poly(etherester-urethanes), poly(ester-ureas), poly(ether-ureas), poly(etherester-ureas), combinations of these, and the like. Preferred self-assembling units in the membrane compound useful in the present invention are bis-amides, bis-urethanes and bis-urea units or their higher oligomers. The oligomers or polymers may simply be referred to herein as polymers, which includes homopolymers or homooligomers as well as interpolymers or interoligomers such as co-polymers, terpolymers, etc.

Exemplary embodiments of these kinds of oligomers and polymers and their preparations are described in U.S. Pat. No. 6,172,167; U.S. Pat. Pub. No. 2010-0126341; U.S. Pat. Pub. No. 2008-0214743; PCT Pub. No. WO 2007/099397; PCT Pub. No. WO 2007/030791; PCT Pub. No. WO 2008/101051; and PCT Pub. No. WO 2008/112833; and Applicant's co-pending application having Ser. No. 61/424,735 titled CROSSLINKED SILANE-MODIFIED MOLECULARLY SELF-ASSEMBLING MATERIAL, filed Dec. 20, 2010, in the names of Matteucci et al., now PCT Pub. No. WO 2012/088077.

The ester and nitrogen content of the membrane compounds makes them suitable for use in membrane separation. The nitrogen-containing moieties have a polar, basic character. Consequently, these moieties tend to have an affinity for acidic contaminants such as $CO_2$, $COS$, $H_2S$, and the like. The ester moieties generally have a strong affinity for $CO_2$. Consequently, membranes made from one or more of these compounds have a selectivity for separating acid gases, particularly $CO_2$, from nonpolar gases such $N_2$, $O_2$, methane, or other hydrocarbons. This makes these polymers very suitable for membrane purification of flue or natural gas, where it is desirable to remove acid gas contaminants from the flue or natural gas.

Without wishing to be bound by theory, it is believed that preferred embodiments of membrane compounds in the form of oligomers and/or polymers have the ability to physically self crosslink. This ability also is referred to in the art as the ability to self-assemble. Non-covalent bonding interactions include: electrostatic interactions (ion-ion, ion-dipole or dipole-dipole), coordinative metal-ligand bonding, hydrogen bonding, π-π-structure stacking interactions, donor-acceptor, and/or van der Waals forces and can occur intra- and intermolecularly to impart structural order. One preferred mode of self-assembly is hydrogen-bonding and this non-covalent bonding interactions is defined by a mathematical "Association constant", K (assoc) constant describing the relative energetic interaction strength of a chemical complex or group of complexes having multiple hydrogen bonds. Such complexes give rise to the higher-ordered structures in a mass of membrane compounds.

Further description of self assembling multiple H-bonding arrays can be found in "Supramolecular Polymers", Alberto Ciferri Ed., 2nd Edition, pages (pp) 157-158. A "hydrogen bonding array" is a purposely synthesized set (or group) of chemical moieties (e.g. carbonyl, amine, amide, hydroxyl. etc.) covalently bonded on repeating structures or units to prepare a self assembling molecule so that the individual chemical moieties preferably form self assembling donor-acceptor pairs with other donors and acceptors on the same, or different, molecule. A "hydrogen bonded complex" is a chemical complex formed between hydrogen bonding arrays. Hydrogen bonded arrays can have association constants K (assoc) between $10^2$ and $10^9$ $M^{-1}$ (reciprocal molarities), generally greater than $10^3$ $M^{-1}$. In preferred embodiments, the arrays are chemically the same or different and form complexes.

It is further believed that the ability of such membrane compounds to physically self-crosslink is one factor contributing to the excellent membrane properties of these materials. Upon physically crosslinking, an oligomer and/or polymer effectively forms larger associated or assembled oligomers and/or polymers through the physical intramolecular and intermolecular associations. Without wishing to be bound by theory, it is believed that such physical associations may not increase the molecular weight (weight average molecular weight, Mw, or number average molecular weight Mn) or chain length of the self-assembling material. It is also believed that the associations are predominantly physical so that little if any covalent bonds form. This combining or assembling occurs spontaneously upon a suitable triggering event such as drying or cooling. Examples of other triggering events could include shear-induced crystallizing, contacting a nucleating agent, and/or the like.

As a consequence of these physical crosslinking characteristics, preferred embodiments of membrane oligomers and/or polymers to some degree are able to exhibit mechanical properties similar to some higher molecular weight synthetic polymers upon physical crosslinking, but yet are able to exhibit viscosities comparable to very low molecular weight compounds when the materials are incorporated into fluid admixtures such as melts, solutions, dispersions, or the like. The materials, therefore, are easy to cast or otherwise form into membrane media from fluid precursors.

Yet, membrane compounds that merely physically crosslink show poor resistance to $CO_2$-induced plasticization. The present invention recognizes this and further chemically crosslinks the materials with an azide crosslinking agent. Because these materials can both physically crosslink and are further chemically crosslinked via use of an azide crosslinking agent, it can be appreciated that the cured compositions of the present invention are both physically and chemically crosslinked. Surprisingly, even though many embodiments of the oligomer and polymer membrane materials are flexible and mobile themselves, which are characteristics that indicate susceptibility to plasticization, the combination of the rigid azide-based crosslinked structure with the physical crosslinks yields membrane products with unexpected stability and high resistance to plasticization. It appears that the azide residues are not only rigid and stable themselves, but the azide residues also stabilize the physically crosslinked structure as well.

The ester and nitrogen-containing moiety content of the membrane compounds provide the membrane compounds with polar characteristics. Prior to physical and/or chemical crosslinking, the materials are quite flexible in contrast to the very rigid polymer materials used in the Du Article cited above.

Exemplary embodiments of oligomer and/or polymer membrane compounds have number average molecular weights, MWn (interchangeably referred to as Mn) of 2000 grams per mole or more, more preferably at least about 3000 g/mol, and even more preferably at least about 5000 g/mol. The MWn of the oligomer and/or polymer membrane compounds preferably is 50,000 g/mol or less, more preferably about 20,000 g/mol or less, yet more preferably about 15,000 g/mol or less, and even more preferably about 12,000 g/mol or less. Number average molecular weight preferably is determined by NMR spectroscopy.

The membrane compound preferably comprises molecularly self-assembling repeat units, more preferably comprising (multiple) hydrogen bonding arrays, wherein the arrays have an association constant K (assoc) preferably from $10^2$ to $10^9$ reciprocal molarity ($M^{-1}$) and still more preferably greater than $10^3$ $M^{-1}$; association of multiple-hydrogen-bonding arrays comprising donor-acceptor hydrogen bonding moieties is the preferred mode of self assembly. The multiple H-bonding arrays preferably comprise an average of 2 to 8, more preferably 4 to 6, and still more preferably at least 4 donor-acceptor hydrogen bonding moieties per molecularly self-assembling unit. Molecularly self-assembling units in preferred membrane compounds include bis-amide groups, and bis-urethane group repeat units and their higher oligomers.

In some embodiments, a membrane compound may include one or more "non-aromatic hydrocarbyl, hydrocarbylene, heterohydrocarbylene, and/or heterohydrocarbyl groups. The term "nonaromatic" refers to groups not having or including any backbone or pendant aromatic structures such as aromatic rings (e.g. arylene or aryal such as substituted or non-substituted phenyl or phenylene), fused aromatic ring structures, and the like. The non-aromatic heterohydrocarbylene and heterocarbyl groups generally include at least one non-carbon atom (e.g. N, O, S, P or other heteroatom) in the backbone of the polymer or oligomer chain. These groups may be linear, branched, cyclic, polycyclic, fused cyclic, and combinations of these. Optionally, non-aromatic hydrocarbyl, hydrocarbylene groups, and/or non-aromatic groups may be substituted with various substituents or functional groups, including but not limited to one or more halides, alkoxy groups, hydroxy groups, thiol groups, ester groups, ketone groups, carboxylic acid groups or salts thereof, sulfate, suffocate, phosphate, phosphonate, $NO_3$, $NO_2$, ammonium, amines, amides, combinations of these, and the like. Preferably, a membrane compound includes less than 5 weight percent, more preferably less than 1 weight percent, and more preferably no aromatic moieties based on the total weight of the compound.

In a set of preferred embodiments, the oligomer and/or polymer membrane compounds comprise ester repeat units of Formula I:

Formula I

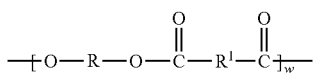

and at least one second repeat unit selected from the esteramide units of Formula II, the esteramide units of Formula III, and/or the ester-urethane units of Formula IV:

Formula II

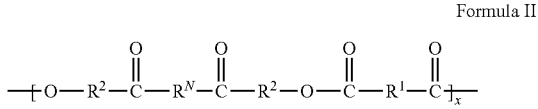

Formula III

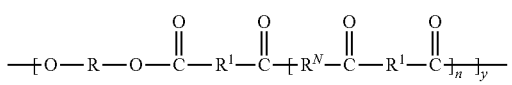

Formula IV

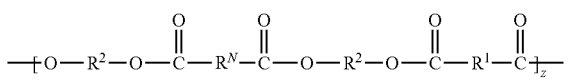

wherein:

R is at each occurrence, independently a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 to about 5000 g/mol. In preferred embodiments, the $C_2$-$C_{20}$ non-aromatic hydrocarbylene at each occurrence is independently specific groups: alkylene-, -cycloalkylene-, -alkylene-cycloalkylene-, -alkylene-cycloalkylene-alkylene- (including dimethylene cyclohexyl groups). Preferably, these aforementioned specific groups are from 2 to 12 carbon atoms, more preferably from 3 to 7 carbon atoms. The $C_2$-$C_{20}$ non-aromatic heterohydrocarbylene groups are at each occurrence, independently specifically groups, non-limiting examples including heteroalkylene, heteroalkylene-cycloalkylene, cycloalkylene-heteroalkylene, or heteroalkylene-cycloalkylene-heteroalkylene, each aforementioned group preferably comprising from 2 to 12 carbon atoms, more preferably from 3 to 7 carbon atoms. Preferred heteroalkylene groups include oxydialkylenes, for example diethylene glycol (—$CH_2CH_2OCH_2CH_2$—O—). When R is a polyalkylene oxide group it preferably is a polytetramethylene ether, polypropylene oxide, polyethylene oxide, or their combinations in random or block configuration wherein the molecular weight (Mn-average molecular weight, or conventional molecular weight) is preferably about 250 g/ml to 5000, g/mol, more preferably more than 280 g/mol, and still more preferably more than 500 g/mol, and is preferably less than 3000 g/mol; in some embodiments, mixed length alkylene oxides are included. Other preferred embodiments include species where R is the same $C_2$-$C_6$ alkylene group at each occurrence, and most preferably it is —$(CH_2)_4$—.

$R^1$ is at each occurrence, independently, a bond, or a $C_1$-$C_{20}$ non-aromatic hydrocarbylene group. In some preferred embodiments, $R^1$ is the same $C_1$-$C_6$ alkylene group at each occurrence, most preferably —$(CH_2)_4$—.

$R^2$ is at each occurrence, independently, a $C_1$-$C_{20}$ non-aromatic hydrocarbylene group. According to another embodiment, $R^2$ is the same at each occurrence, preferably $C_1$-$C_6$ alkylene, and even more preferably $R^2$ is —$(CH_2)_2$—, —$(CH_2)_3$—, —$(CH_2)_4$—, or —$(CH_2)_5$—.

$R^N$ is at each occurrence —N($R^3$)—Ra—N($R^3$)—, where $R^3$ is independently H or a $C_1$-$C_6$ alkyl, preferably $C_1$-$C_4$ alkyl, or $R^N$ is a $C_2$-$C_{20}$ heterocycloalkylene group containing the two nitrogen atoms; w represents the ester mol fraction, and x, y and z represent the amide or urethane mole fractions where w+x+y+z=1, 0<w<1, and at least one of x, y, and z is greater than 0. Ra is a $C_2$-$C_{20}$ non-aromatic hydrocarbylene group, more preferably a $C_2$-$C_{12}$ alkylene: most preferred Ra groups are ethylene, butylene, and hexylene —$(CH_2)_6$—. In some embodiments, $R^N$ is piperazin-1,4-diyl. According to another embodiment, both $R^3$ groups are hydrogen.

n is at least 1 and has a mean value less than 2.

In other alternative embodiments, the oligomer and/or polymer membrane compounds comprise repeat units of (a) Formula I and (b) either Formula II and/or Formula III, wherein R, $R^1$, $R^2$, $R^N$, and n are as defined above, w, x and y are mole fractions wherein w+x+y=1, and 0≤x≤1 and 0≤y≤1, and in some embodiments, the preferred embodiments, the copolymer comprises at least 15 mole percent W units.

In certain polyesteramide embodiments comprising Formula I and II units, or Formula I, II, and III units, particularly preferred materials are those wherein R is —($C_2$-$C_6$)-alkylene, especially —$(CH_2)_4$—. Also preferred are materials wherein $R^1$ at each occurrence is the same and is $C_1$-$C_6$ alkylene, especially —$(CH_2)_4$—. Further preferred are materials wherein $R^2$ at each occurrence is the same and is —($C_1$-$C_6$)-alkylene, especially —$(CH_2)_5$-alkylene. An exemplary polyesteramide according to such embodiments preferably has a number average molecular weight (Mn) of at least about 4000, and no more than about 20,000. More preferably, the molecular weight is no more than about 12,000.

For convenience the chemical repeat units for various embodiments are shown independently. The invention encompasses all possible distributions of the w, x, y, and z units in the copolymers, including randomly distributed w, x, y and z units, alternatingly distributed w, x, y and z units, as well as partially, and block or segmented copolymers, the definition of these kinds of copolymers being used in the conventional manner as known in the art. Additionally, there are no particular limitations in the invention on the fraction of the various units, provided that the copolymer contains at least one w and at least one x, y, and/or z unit. In some embodiments, the mole fraction of w to (x+y+z) units is between about 0.1:0.9 and about 0.9:0.1. In some preferred embodiments, the copolymer comprises at least 15 mole percent w units, at least 25 mole percent w units, or at least 50 mole percent w units.

A specific example of a suitable membrane compound comprises units according to Formula V and Formula VI:

Formula V

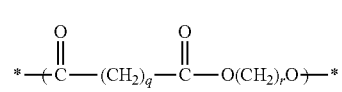

Formula VI

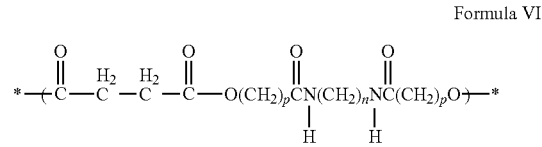

wherein q and r are 4, n is 2, p is 5, x is 0.18, and y is 0.82. According to another specific example, a suitable membrane compound comprises units according to Formula V and VI, wherein q and r are 4, n is 2, p is 5, x is 0.5, and y is 0.5.

Preferably, polydispersities of substantially linear membrane compounds useful in the present invention is 4 or less, more preferably 3 or less, still more preferably 2.5 or less, still more preferably 2.2 or less.

Curable compositions of the present invention involve a combination of one or more membrane compounds and one or more azide crosslinking agents. An azide crosslinking agent refers to a compound comprising two or more azide moieties. An azide moiety is an anion with the formula —$N_3^-$. Exemplary embodiments of azide crosslinking agents include from 2 to 6 azide moieties, preferably 2 azide moieties. Advantageously, azide crosslinking agents when used in combination with the physically crosslinking membranes described above help to from a stiff, stable membrane structure that resists plasticization so that resultant membranes have long lasting, stable separation properties.

Exemplary azide crosslinking agents may be represented by the following formula

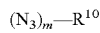

wherein m is 1 to 6, preferably 2, and $R^{10}$ is an m-valent moiety that may be aryl or nonaryl: saturated or unsaturated; linear or branched or cyclic; and/or substituted or unsubstituted. In some embodiments, $R^{10}$ is aryl and comprises at least one, preferably at least 2 aromatic ring moieties. Some or all of the aromatic ring moieties may be fused and/or linked by suitable linking groups.

Exemplary aryl embodiments of azide crosslinking agents may be represented by the following formula

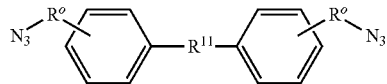

wherein each $R^o$ and $R^{11}$ independently is a divalent linking group that may comprise a heteroatom such as one or more of O, S, P, or the like and that may be linear, branched, cyclic, polycyclic, fused ring, or the like; with the proviso that each $R^o$ independently may be a single bond. Each $R^o$ and $R^{11}$ may be saturated or unsaturated. Each $R^o$ and $R^{11}$ independently may be substituted or unsubstituted. If present, exemplary substituents may include one or more halides, alkoxy groups, hydroxy groups, thiol groups, ester groups, ketone groups, carboxylic acid groups or salts thereof, sulfate, sultanate, phosphate, phosphonate, $NO_3$, $NO_2$, ammonium, amines, urethane, urea, amides, combinations of these, and the like. If any $R^o$ or $R^{11}$ has a backbone or pendant moieties include 1 or more C atoms, the backbone or such moieties independently may include one or more heteroatoms. Optionally, the aromatic ring structures may be further substituted or unsubstituted with substituents such as the exemplary substituents described herein. For purposes of illustration, other than the pendant —$R^o$—$N_3$ moieties and the $R^{11}$ linking group, the aromatic ring structures are unsubstituted.

A preferred azide crosslinking agent according to this formula has the structure (hereinafter referred to as bisazide A):

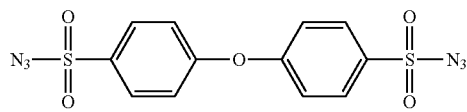 [SMILES: [N-]=[N+]=NS(=O)(=O)c1ccc(Oc2ccc(S(=O)(=O)N=[N+]=[N-])cc2)cc1]

Another azide crosslinking agent according to this formula has the following structure:

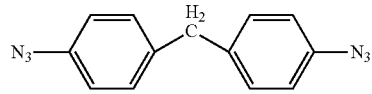 [SMILES: [N-]=[N+]=Nc1ccc(Cc2ccc(N=[N+]=[N-])cc2)cc1]

In some modes of practice, $R^{11}$ is a linear, branched, cyclic, or polycyclic hydrocarbyl moiety of the formula

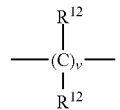

wherein v is 1 to 10, preferably 1 to 6, more preferably 1 to 4; each $R^{12}$ independently is H, alkyl of 1 to 10 carbon atoms, alkoxy of 1 to 10 carbon atoms. Optionally, each $R^{12}$ independently may be substituted with one or more substituents such as the exemplary substituents listed above. Specific hydrocarbyl embodiments of $R^{11}$ include —$CH_2$—, —$CH_2CH_2$—, —$CH_2CH_2CH_2$—; —$CH_2CH(CH_3)$—; —$CH_2CH(CH_3)CH_2$—; —$CH_2CH_2CH_2CH_2$—; combinations of these, and the like.

In other modes of practice, each of $R^o$ and $R^{11}$ independently is a linear, branched, cyclic, or polycyclic alkoxylene moiety of the formula

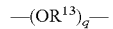

wherein q is 1 to 10, preferably 1 to 6, more preferably 1 to 4; and $R^{13}$ is a divalent alkylene moiety that may be linear, branched, cyclic, or polycyclic. Optionally, each $R^{13}$ independently may be substituted with one or more substituents such as the exemplary substituents listed above. Specific alkoxylene embodiments of $R^{11}$ include —$OCH_2$—, —$OCH_2CH_2$—, —$OCH_2CH_2CH_2$—; —$OCH_2CH(CH_3)$—; —$OCH_2CH(CH_3)CH_2$—; —$OCH_2CH_2CH_2CH_2$—; combinations of these, and the like.

Other examples of the divalent moieties $R^o$ and R11 include oxygen as well as

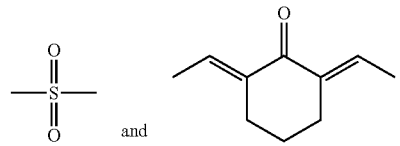

Other aryl embodiments of $R^{10}$ may have fused ring structures such as

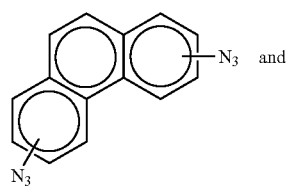

The fused ring structures are shown for purposes of illustration as being unsubstituted except for the azide groups.

Optionally other pendant substituents such as one or more of the exemplary substituents listed herein may be present.

Nonaryl embodiments of azide crosslinking agents include a variety of compounds including compounds such as $N_3$—$(R^{13}O)_q$—$R°$—$N_3$, wherein $R^{13}$, q, and $R°$ are independently as defined above.

Without wishing to be bound, it is believed that an azide group leads to crosslinking initially by releasing $N_2$, leaving a highly reactive nitrene moiety. This moiety can then displace H from a C—H bond in the polymer backbone. Then, the nitrene forms a covalent bond with the carbon atom. It is believed that any C—H bond could be a viable site for this crosslinking. It is possible that the carbon atoms in an alpha position proximal to a carbonyl moiety may form relatively stable radicals and may be preferred sites for this crosslinking.

The total amount of azide crosslinking agent(s) used to crosslink the membrane compounds and thereby form dimensionally stable, plasticization-resistant membrane structures can vary over a wide range. Generally, if too little of the crosslinking material is used, the cured material may not be as resistant to plasticization as desired. On the other hand, if too much is used, then chain-scission or film cracking can occur. Balancing these concerns, azide crosslinking desirably is accomplished in many embodiments by using at least 0.25 weight percent, desirably at least 0.5 weight percent, more desirably at least 1.0 weight percent of the total amount of azide crosslinking agent(s) based on the total amount of membrane compound(s). Further, azide crosslinking desirably is accomplished in many embodiments by no more than 25 weight percent, desirably no more than 20 weight percent, more desirably no more than 15 weight percent of the total amount of azide crosslinking agent(s) based on the total amount of membrane compound(s).

In addition to the membrane compound(s) and the azide crosslinking agent(s), curable compositions of the present invention optionally may include one or more other ingredients. In some embodiments, the optional other ingredients including and without limitation thereto, other polymers, resins, tackifiers, fillers, oils, flame retardants, antioxidants, fungicides, bactericides, antistatic agents, uv protection agents, pigments, dyes, reinforcing agents combinations of these, and the like.

For example, additional resin materials that may be incorporated into compositions of the present invention include one or more polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate, cellulose triacetate, cellulose acetate-butyrate, cellulose propionate, ethyl cellulose, methyl cellulose, nitrocellulose, etc.; polyimides, polyetherimides, and polyamides, including aryl polyamides, aryl polyimides such as Matrimid® 5218 and aryl polyetherimides such as Ultem® 1000; polyethers; poly(arylene oxides) such as poly(phenylene oxide) and poly(xylene oxide); poly (esteramide-diisocyanate); polyurethanes; polyesters (including polyarylates), such as poly(ethylene terephthalate), poly(alkyl methacrylates), poly(acrylates), poly(phenylene terephthalate), etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly (vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly (vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include exemplary substituents as listed herein.

The curable compositions of the present invention have a wide range of uses. In particular, the compositions can be used to fabricate separation membranes that are especially useful in the purification, separation or adsorption of a particular species in a liquid or gas phase. In addition to separation of gases, these membranes may be used for the separation of proteins or other pharmaceutical and biotechnology materials. The membranes may also be used in fermenters and bioreactors to transport gases into the reaction vessel and transfer cell culture medium out of the vessel. Additionally, the membranes may be used for the removal of microorganisms from air or water streams, water purification, ethanol production in a continuous fermentation/membrane pervaporation system, and in detection or removal of trace compounds or metal salts in air or water streams.

The membranes are especially useful in gas/vapor separation processes in chemical, petrochemical, pharmaceutical and allied industries for removing acid gases from mixed gas streams. In preferred modes of practice, the membranes may be used to remove acid gases (e.g., $CO_2$, COS, $H_2S$, and the like) from hydrocarbons in streams of natural gases or flue gases in that the membranes have high acid gas permeability, low nonpolar gas permeability, and resistance to plasticization. Further, the membrane characters are stable and uniform over time.

For instance, the membranes would allow carbon dioxide to diffuse through the membrane at a faster rate than the nonpolar gases (such as methane, ethane, propane, or butane, or other gases such as nitrogen, oxygen, or the like) that may be present in a natural gas. Carbon dioxide has higher permeation rate than methane because of higher solubility, higher diffusivity, or both. Thus, carbon dioxide enriches on the permeate side of the membrane, and methane enriches on the feed side of the membrane.

Examples of a flue gas are combustion gases produced by burning coal, oil, natural gas, wood, hydrogen gas, or a combination thereof. A natural gas can be naturally-occurring (i.e., found in nature) and/or manufactured. Examples of a manufactured methane gas-containing gas mixture are methane 30 produced as a by-product from a crude oil cracking operation and biogas, which can be produced in landfills or sewage facilities from catabolism of garbage and biological waste by microorganisms. In some embodiments the unit operation is employed downstream from a furnace or other combustion apparatus for separating acid gas from flue gas or downstream from an oil or natural gas well-head for separating acid gas from natural gas.

In an exemplary separation method, a membrane of the present invention having an inlet surface and an outlet surface is provided. Additionally, a feed gas mixture comprising at least one acid gas and at least one nonpolar gas is provided. The feed gas mixture is caused to contact the inlet surface of the membrane under conditions such that at least a portion of the acid gas permeates through the membrane at a faster rate than the at least one nonpolar gas. Exemplary conditions include causing the contact to occur while a suitable pressure differential exists between the inlet and outlet faces of the membrane. A result is that, compared to the feed gas mixture, the separation yields a first separation product proximal to the outlet face of the membrane that is enriched with respect to an acid gas. In the meantime, a second separation product with a depleted acid gas content relative to the feed gas mixture is produced proximal to the inlet face of the membrane.

The membranes may take any form known in the art, for example hollow fibers, tubular shapes, flat sheets, spiral wound, pleated, and other membrane shapes. The compounds are particularly useful for making thin film membranes that have high selectivity for acid gases relative to nonpolar gases. A thin film selective membrane refers to a selective membrane having a thickness on the order of about 10 microns or less, preferably 2 microns or less, more preferably 1 micron or less. In many embodiments, such thin film membranes have a thickness of at least about 20 nm, preferably at least about 50 nm, more preferably at least about 100 nm. In those embodiments in which a membrane is formed from a stack of two or more selective sublayers, these thickness features refer to the total thickness of all the layers. The thickness taught herein does not include the thickness contributed by non-selective supporting layers or other non-membrane components.

The membranes of the present invention are functional over a wide range of temperatures and pressure differentials. For example, the membranes may be used to treat feed material provided at one or more temperatures in the range from −50° C. to 300° C., preferably −30° C. to 100° C., more preferably −10° C. to 90° C., and even more preferably 20° C. to 70° C. Further, the pressure differential between the upstream and downstream sides of the membrane may be in the range from 90 kPa to 10,000 kPa, preferably 200 kPa to 1000 kPa. Advantageously, the membranes display stable selectivity, and permeability characteristics at high temperatures and/or pressures, whereas prior membrane embodiments might have been more susceptible to plasticization or other degradation at such higher temperatures and pressures.

The curable compositions can be formed into membrane structures in a variety of ways. According to one approach, a fluid admixture incorporating the ingredients of the curable composition is provided. This can be a melt, solution, dispersion, or the like. The fluid composition is then cast, extruded, calendared, sprayed, coated, molded, or otherwise used to form the desired membrane structure. Suitable curing energy, such as thermal energy, can then be used to initiate azide crosslinking. It is desirable that heating is uniform and of a sufficient duration to accomplish azide crosslinking. However, the duration and temperature should be limited to avoid cracking or otherwise degrading the ingredients or the resultant product.

In an exemplary mode of practice for forming a thin film membrane, a curable composition of the present invention in the form of a melt is cast onto polymer support in contact with a heated metal plate. The plate helps to ensure even heating of the film. The casting may occur under the ambient atmosphere or may be practiced in a protected, inert atmosphere, e.g., under a blanket of argon, nitrogen, or the like. Once most if not all solvent is removed from film, the heated metal plate is heated to a curing temperature, which in many embodiments may be at a curing temperature in the range from 20° C. to about 160° C., preferably 100° C. to about 140° C. The casting may occur under the ambient atmosphere or may be practiced in a protected, inert atmosphere, e.g., under a blanket of argon, nitrogen, or the like. The cast material desirably is heated on the metal plate for a time period in the range from 20 seconds to about 72 hours, preferably 1 minutes to about 10 minutes. After heating, the film is cooled. The resultant sheet membrane is believed to incorporate both physical and chemical crosslinks.

The present invention will now be further described with respect to the following illustrative examples.

Example 1

Making C2C50% Polymer Useful as a Membrane Compound in the Practice of the Present Invention Step (a) Preparation of the diamide diol, ethylene-N,N'-dihydroxyhexanamide (C2C) monomer:

A diamide diol monomer (referred to as the C2C diamide diol monomer or the C2C monomer) is prepared by reacting 1.2 kg ethylene diamine (EDA) with 4.56 kilograms (kg) of ε-caprolactone under a nitrogen blanket in a stainless steel reactor equipped with an agitator and a cooling water jacket. An exothermic condensation reaction between the ε-caprolactone and the EDA occurs which causes the temperature to rise gradually to 80 degrees Celsius (° C.). A white deposit forms and the reactor contents solidify, at which the stirring is stopped. The reactor contents are then cooled to 20° C. and are then allowed to rest for 15 hours. The reactor contents are then heated to 140° C. at which temperature the solidified reactor contents melt. The liquid product is then discharged from the reactor into a collecting tray. A nuclear magnetic resonance study of the resulting product shows that the molar concentration of C2C diamide diol in the product exceeds 80 percent. The melting temperature of the C2C diamide diol monomer product is 140° C.

Step (b): Contacting C2C monomer with dimethyl adipate (DMA):

A 100 liter single shaft Kneader-Devolatizer reactor equipped with a distillation column and a vacuum pump system is nitrogen purged, and heated under nitrogen atmosphere to 80° C. (based on thermostat). Dimethyl adipate (DMA; 38.324 kg) and C2C diamide diol monomer (31.724 kg) are fed into the kneader. The slurry is stirred at 50 revolutions per minute (rpm).

Step (c): Contacting C2C/DMA with 1,4-butanediol, distilling methanol and transesterification:

1,4-Butanediol (18.436 kg) is added to the slurry of Step (b) at a temperature of about 60° C. The reactor temperature is further increased to 145° C. to obtain a homogeneous solution. Still under nitrogen atmosphere, a solution of titanium(IV)butoxide (153 g) in 1.380 kg 1,4-butanediol is injected at a temperature of 145° C. into the reactor, and methanol evolution starts. The temperature in the reactor is slowly increased to 180° C. over 1.75 hours, and is held for 45 additional minutes to complete distillation of methanol at ambient pressure. 12.664 kilograms of methanol are collected.

Step (d): distilling 1,4-butanediol and polycondensation to give C2C50% polymer product Reactor dome temperature is increased to 130° C. and the vacuum system activated stepwise to a reactor pressure of 7 mbar (0.7 kiloPascals (kPa)) in 1 hour. Temperature in the kneader/devolatizer reactor is kept at 180° C. Then the vacuum is increased to 0.7 mbar (0.07 kPa) for 7 hours while the temperature is increased to 190° C. The reactor is kept for 3 additional hours at 191° C. and with vacuum ranging from 0.87 to 0.75 mbar. At this point a sample of the reactor contents is taken (Preparation 2A); melt viscosities were 6575 megaPascals (mPas) at 180° C. and 5300 mPas at 190° C. The reaction is continued for another 1.5 hours until the final melt viscosities are recorded as 8400 mPas at 180° C. and 6575 mPas at 190° C. (Preparation 2B). Then the liquid Kneader/Devolatizer reactor contents are discharged at high temperature of about 190° C. into collecting trays, the resultant C2C50% polymer is cooled to room temperature and grinded. The C2C50% polymer is a polyesteramide (PEA) polymer containing 50 mol percent of the C2C monomer.

Example 2

Using Azide Crosslinking Agent and C2C50% Polymer to Make a Membrane 5 g of C2C50% polymer and 0.6 g of bisazide A were dissolved in 20 mL of chloroform. Once dissolved, solution was cast onto 100 mm Teflon petri dish and covered to allow solvent to evaporate. After casting and drying, sample was placed in an oven at 130° C. and allowed to cure for 72 hours. Sample was then removed and allowed to cool to room temperature.

Example 3

Preparation of PEA Polymer Containing 18 Mole Percent of C2C Monomer

Polymer Herein Referred to as C2C18% Polymer

Into a 1-neck 500 mL round bottom flask is loaded titanium (IV) butoxide (0.31 g, 0.91 mmol), N,N'-1,2-ethanediyl-bis [6-hydroxyhexanamide] (C2C monomer, 30.80 g, 0.1068 mol), dimethyl adipate (103.37 g, 0.5934 mol), and 1,4-butanediol (97.33 g, 1.080 mol). A stir-shaft and blade are inserted into the flask along with a modified Claisen adaptor with Vigreux column and distillation head. Apparatus is completed with stir bearing, stir motor, thermometer, take-off adaptor, receiver, heat-tracing and insulation, vacuum pump, vacuum regulator, nitrogen feed, and temperature controlled bath. Apparatus is degassed and held under positive nitrogen. Flask is immersed into a 160° C. bath with temperature raised to 175° C. for a total of 2 hours. Receiver is changed and vacuum is applied according to the following schedule: 5 minutes, 450 Torr (60 kiloPascals (kPa)); 5 minutes, 100 Torr; 5 minutes, 50 Torr; 5 minutes, 40 Torr; 10 minutes, 30 Torr; 10 minutes, 20 Torr; 1.5 hours, 10 Torr. Apparatus is placed under nitrogen, receiver changed, and placed under vacuum ranging over about 0.36 to about 0.46 Torr with the following schedule: 2 hours, 175° C.; 2 hours, to/at 190° C., and 3 hours to/at 210° C. The resultant PEA polymer product contains 18 mole percent of the C2C monomer.

Example 4

Using Azide Crosslinking Agent and C2C18% Polymer to Make a Membrane 2 g PEA-C2C18% polymer and 0.3 g of bisazide A were dissolved in 10 mL of chloroform. Sample was cast on to a porous polysulfone/polyethylene terephthalate support using an Automatic Drawdown Machine II, from Gardco with a Wire #5 casting rod from RD Specialties. Selective layer thickness was between 5 and 10 microns according to SEM. A section of the cast film and support was mounted on a metal sheet and then exposed to 90° C. for 6 minutes in a oven. The cured membrane sample of the present invention was removed from the oven and allowed to cool to room temperature.

Example 5

Comparative

Using C2C18% Polymer to Make a Membrane without Azide Crosslinking 2 g of PEA-C2C18% polymer were dissolved in 20 mL of chloroform. Once dissolved, sample is cast and dried using the casting method taught for Example 4 but without using an azide crosslinking agent.

Example 6

Comparative

Using C2C18% Polymer to Make Membrane with Alternative Silane Crosslinking Scheme Into a silylated 3-neck, 250 mL round bottom flask with nitrogen gas pad load a magnetic stir-bar, anhydrous chloroform (amylene stabilized, 120 mL), and dry PEA C2C18% from Preparation 1 (17.11 gram). The flask is silylated by filling it with a silylating agent (such as chlorotrimethylsilane in toluene with pyridine as HCl scavenger) and allowing to soak overnight under ambient conditions prior to use. Upon dissolution, inject dibutyltindilaurate (0.032 mL) into the flask. Fit flask with a Dean-Stark type trap and condenser. Heat and distill about 20 mL of chloroform into the trap, and drain the distillate from the trap and discard it. Upon cooling to ambient temperature, inject 3-isocyanatopropyltriethoxysilane (2.24 mL, 9.0 mmol (CH$_3$CH$_2$O)$_3$SiCH$_2$CH$_2$CH$_2$NCO) into the flask. Follow reaction progress by Fourier Transform Infrared (FT-IR) spectroscopy for 68 hours to give a solution of a reactive silane modified PEA C2C18% polymer dissolved in chloroform. Remove an aliquot of the solution and evaporate the chloroform so as to isolate some of the reactive silane-modified PEA C2C18% material (hereinafter Si—C2C18% polymer).

Example 8

Comparative

Using Si—C2C18% Polymer to Make Non-Silane Crosslinked Membranes and Silane Crosslinked Membranes Remove several aliquots of the chloroform solution of the reactive silane-modified PEA C2C18%, and separately cast the removed chloroform solutions as films under anhydrous conditions (nitrogen gas blanket) so as to give membranes of the silane-modified PEA C2C18% but with de minimis or no silane crosslinking.

Example 9

Comparative

Using Si—C2C18% Polymer to Make Non-Silane Crosslinked Membranes and Silane Crosslinked Membranes Silane-cured membrane is made using the Si—C2C18% material with water as follows. Place film-shaped reactive silane-modified PEA C2C18% polymer in a sealed plastic bag with 3.5 mL deionized water, and heat bag and contents at 50° C. for about 60 hours to give silane-cured membrane.

Example 10

Performance Testing

Mixed Gas Selectivity Apparatus:

Use a mixed gas permeation system designed as shown in FIG. 1 of U.S. Patent Pub. No. Applicant's co-pending application having Ser. No. 61/424,735 titled CROSSLINKED SILANE-MODIFIED MOLECULARLY SELF-ASSEMBLING MATERIAL, filed Dec. 20, 2010, in the names of Matteucci et al., now PCT Pub. No. WO 2012/088077 and as further described in the corresponding specification of this patent application. Reference numerals included in the following text are from such FIG. 1 and its corresponding description.

Mixed Gas Selectivity Procedure:

Using apparatus 10 of FIG. 1 at 20° C. and a feed gas composed of $CH_4$ gas and $CO_2$ gas where feed gas composition can be determined using the gas chromatograph 70, dispose a test plaque (membrane) 50 (prepared by the solution casting method as described herein) in gas permeation cell 40, and dispose the resulting gas permeation cell containing test plaque 50 inside of oven 30. Allow the mixed gas stream to flow into volume 41 and contact entrance face 51 of test plaque (membrane) 50. Remove permeation-resistant gases to permeation-resistant gas loop 61. Sweep permeant gas(es) (i.e., gases that have permeated through test plaque 50) away from the exit face 53 of test plaque (membrane) 50 and out of volume 43 of cell 40 using a He gas stream flowing at 5 milliliters per second (mL/s). The He gas sweeping allows for the test plaque (membrane) 50 to effectively operate as if its exit face 53 were exposed to a vacuum. Separately send some of permeation-resistant gas from volume 41 and swept permeant gas from volume 43 to a Model No. 5890 (Hewlitt Packard) gas chromatograph 70 to determine compositions thereof. Between testing with the different mixed gases, evacuate the upstream and downstream volumes in the cell using a vacuum pump for at least 16 hours at 20° C. Calculate mixed gas selectivities as follows. Mixed gas selectivity, $\alpha_{A/B}$, can be determined according to equation (EQ-a):

$$\alpha_{A/B} = \frac{x_A / y_A}{x_B / y_B} \quad \text{(EQ-a)}$$

where xA and xB are the molar concentrations of component A and B in the permeant gas; yA and yB are the molar concentrations of component A and B in the mixed gas stream (feed), respectively. For example, component A can be $CO_2$ gas and component B can be $CH_4$ gas or $N_2$ gas.

Industrial gas separations are generally run at high $CO_2$ pressures, which causes plasticization in most polymers. This plasticization causes a loss in selectivity, which often renders polymeric membranes inappropriate for a separation. Also, many industrial processes require separations to be conducted at elevated temperatures, such as 50° C. The bis-azide crosslinked membranes exhibit improved resistance to plasticization than non-chemically crosslinked polymers and even better performance than polymers chemically crosslinked via other functionality such as via silane functionality.

Shown in Table 1 is the mixed gas $CO_2/CH_4$ selectivities for the membranes made from the following materials, respectively: PEA-C2C18% polymer, cured silylated PEA-C2C18% polymer, bisazide cured PEA-C2C18% polymer, and bisazide cured PEA-C2C50% polymer. Selectivity was determined, at 50° C. and a $CO_2$ pressure differential of 80 psi.

TABLE 1

| Polymer(s) used to make membrane | Example # | Mixed gas $CO_2/CH_4$ selectivity |
|---|---|---|
| PEA-C2C18%, | Example 5 | 3.3 |
| Cured Bisazide PEA-C2C18% | Example 2 | 7.8 |
| Cured Bisazide PEA-C2C50% | Example 4 | 7.6 |
| Silane-PEA-C2C18% (non-chemically cured) | Example 7 | 4.5 |
| Cured Silane PEA-C2C18%, | Example 8 | 5.2 |

The complete disclosures of the patents, patent documents, technical articles, and other publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A physically and chemically cured membrane composition comprising an inlet face and an outlet face, and incorporating ingredients comprising:

a) at least one membrane compound comprising a plurality of ester moieties and a plurality of N-containing backbone moieties, wherein each N-containing moiety is at least divalent, wherein the at least one compound comprises ester repeat units of Formula I:

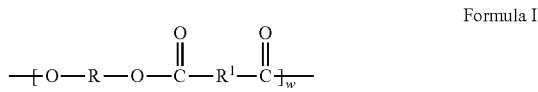

Formula I and at least one second repeat unit selected from the esteramide units of Formula II and/or the esteramide units of Formula III, and optionally at least one repeat unit of the esterurethane units of Formula IV:

Formula II

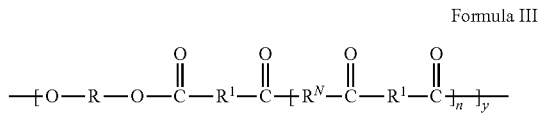

Formula III

-continued

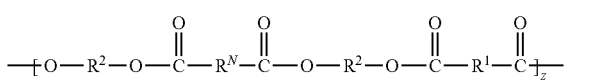
Formula IV wherein:
each R is independently selected from a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 to about 5000 g/mol;

each $R^1$ independently is a bond or a $C_1$-$C_{20}$ non-aromatic hydrocarbylene group;

each $R^2$ independently a $C_1$-$C_{20}$ non-aromatic hydrocarbylene group;

each $R^N$ independently is —N($R^3$)—Ra—N($R^3$)—, where each $R^3$ is independently H or a $C_1$-$C_6$ alkyl or $R^N$ is a $C_2$-$C_{20}$ heterocycloalkylene group containing at least two nitrogen atoms;

w+x+y+z=1, 0<w<1, and at least one of x and y is greater than 0;

Ra is a $C_2$-$C_{20}$ non-aromatic hydrocarbylene group; and n is at least 1 and has a mean value less than 2;
and b) at least one azide crosslinking agent that chemically crosslinks the at least one membrane compound.

2. The composition according to claim 1, wherein the at least one compound has a number average molecular weight in the range from 2000 to 50,000.

3. The composition according to claim 1, wherein the at least one compound is nonaromatic.

4. The composition according to claim 1, wherein a repeating unit according to Formula I has a structure according to Formula V and a repeating unit according to Formula II has the structure according to Formula VI:

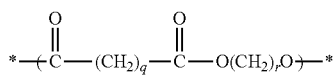
Formula V

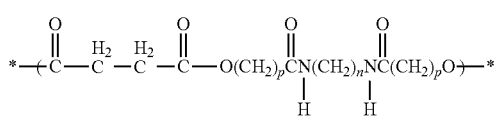
Formula VI wherein q and r are 4, n is 2, p is 5, x is 0.18 and y is 0.82.

5. The composition according to claim 1, wherein the azide crosslinking agent comprises a compound represented by the following formula

wherein m is 1 to 6 and $R^{10}$ is an m-valent moiety that may be aryl or nonaryl; saturated or unsaturated; linear or branched or cyclic; and/or substituted or unsubstituted.

6. The composition according claim 1, wherein the azide crosslinking agent comprises a compound represented by the following formula

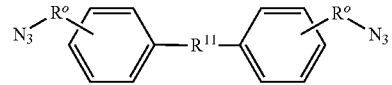

wherein each $R^o$ and $R^{11}$ independently is a divalent linking group that may comprise a heteroatom such as one or more of O, S, P, or the like and that may be linear, branched, cyclic, polycyclic, fused ring, or the like; with the proviso that each $R^o$ independently may be a single bond.

7. The composition according to claim 6, wherein $R^{11}$ is a linear, branched, cyclic, or polycyclic hydrocarbyl moiety of the formula

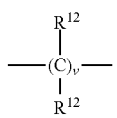

wherein v is 1 to 10; each $R^{12}$ independently is H, alkyl of 1 to 10 carbon atoms, alkoxy of 1 to 10 carbon atoms.

8. The composition according to claim 6, wherein each of $R^o$ and $R^{11}$ independently is a linear, branched, cyclic, or polycyclic alkoxylene moiety of the formula

wherein q is 1 to 10; and $R^{13}$ is a divalent alkylene moiety that may be linear, branched, cyclic, or polycyclic.

9. The composition according to claim 6, wherein each $R^o$ and $R^{11}$ independently is selected from oxygen,

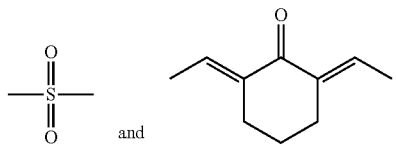

10. The composition according to claim 1, wherein the azide crosslinking agent comprises a compound having a fused ring structure.

11. The composition according to claim 1, wherein the azide crosslinking agent comprises a substituted or unsubstituted material according to the formula

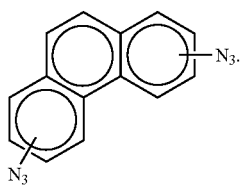

12. The composition according to claim 1, wherein the azide crosslinking agent comprises a substituted or unsubstituted material according to the formula

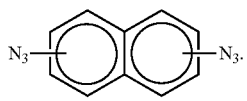

13. The composition according to claim 1, wherein the azide crosslinking agent comprises a substituted or unsubstituted material according to the formula $N_3-(R^{13}O)_q-R^o-N_3$, wherein $R^o$ is selected from oxygen,

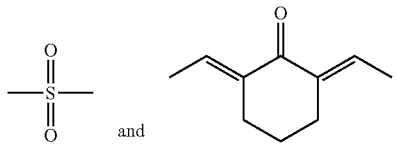

$R^{13}$ is a divalent alkylene moiety that may be linear, branched, cyclic, or polycyclic, and q is 1 to 10.

14. A method of separation, comprising the steps of:
(a) providing a separation membrane derived from ingredients comprising at least one membrane compound comprising a plurality of ester moieties and a plurality of N-containing, divalent backbone moieties and at least one azide crosslinking agent according to claim 1, wherein the membrane compound comprises ester repeat units of Formula I:

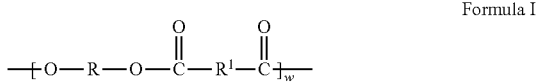

Formula I and at least one second repeat unit selected from the esteramide units of Formula II and/or the esteramide units of Formula III, and optionally at least one repeat unit of the ester-urethane units of Formula IV:

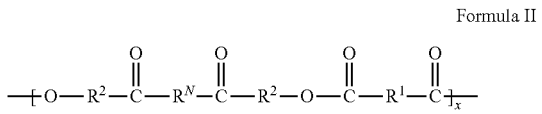

Formula II

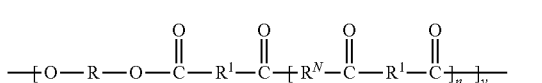

Formula III

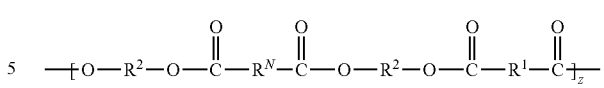

Formula IV wherein:

each R is independently selected from a $C_2$-$C_{20}$ non-aromatic hydrocarbylene group, a $C_2$-$C_{20}$ non-aromatic heterohydrocarbylene group, or a polyalkylene oxide group having a group molecular weight of from about 100 to about 5000 g/mol;

each $R^1$ independently is a bond or a $C_1$-$C_{20}$ non-aromatic hydrocarbylene group;

each $R^2$ independent $C_1$-$C_{20}$ non-aromatic hydrocarbylene group;

each $R^N$ independently is $-N(R^3)-Ra-N(R^3)-$, where each $R^3$ is independently H or a $C_1$-$C_6$ alkyl or $R^N$ is a $C_2$-$C_{20}$ heterocycloalkylene group containing at least two nitrogen atoms;

w+x+y+z=1, 0<w<1, and at least one of x and y is greater than 0;

Ra is a $C_2$-$C_{20}$ non-aromatic hydrocarbylene group; and n is at least 1 and has a mean value less than 2;

(b) using the membrane to separate components of a feed mixture to provide a first separation product that is enriched with respect to an ingredient of the feed mixture and a second separation product that is depleted with respect to the feed ingredient.

15. A purification system comprising:
(a) a feed mixture comprising at least one acid gas and at least one nonpolar gas;
(b) a membrane having an inlet face and an outlet face, wherein the membrane is derived from ingredients comprising at least one compound comprising a plurality of ester moieties and a plurality of N-containing, divalent backbone moieties and at least one azide crosslinking agent according to claim 1; and
(c) a pressure differential between the inlet face and the outlet face effective to provide a first separation product that is enriched with respect to the acid gas relative to the feed mixture and a second separation product that is depleted with respect to the acid gas relative to the feed mixture when the feed mixture is caused to contact the membrane.

* * * * *